(12) United States Patent
Ikeyama (10) Patent No.: US 8,418,003 B2
(45) Date of Patent: Apr. 9, 2013

(54) LOG COLLECTING APPARATUS, PROGRAM, METHOD, AND SYSTEM

(75) Inventor: Makoto Ikeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 12/961,774

(22) Filed: Dec. 7, 2010

(65) Prior Publication Data

US 2011/0145659 A1  Jun. 16, 2011

(30) Foreign Application Priority Data

Dec. 11, 2009  (JP) .................................. 2009-281975

(51) Int. Cl.
*G06F 11/00* (2006.01)

(52) U.S. Cl.
USPC .......................................................... 714/48

(58) Field of Classification Search .................... 714/20, 714/25–28, 37, 38.1, 39, 45, 47.1, 47.3, 48, 714/49

See application file for complete search history.

(56) References Cited

U.S. PATENT DOCUMENTS

| | | | | |
|---|---|---|---|---|
| 7,266,727 B2 * | 9/2007 | Crowell et al. | ................. | 714/36 |
| 7,844,863 B2 * | 11/2010 | Hathorn et al. | ................. | 714/48 |
| 7,865,783 B2 * | 1/2011 | Compton et al. | ............... | 714/49 |
| 2008/0091397 A1 * | 4/2008 | Handley | ......................... | 703/11 |
| 2009/0183036 A1 * | 7/2009 | Hathorn et al. | ................. | 714/48 |
| 2009/0292955 A1 * | 11/2009 | Compton et al. | ............... | 714/48 |

FOREIGN PATENT DOCUMENTS

| | | |
|---|---|---|
| JP | 02-302844 A | 12/1990 |
| JP | 2003-216457 A | 7/2003 |

* cited by examiner

*Primary Examiner* — Nadeem Iqbal
(74) *Attorney, Agent, or Firm* — Fujitsu Patent Center (57) ABSTRACT

A log collecting apparatus includes: a response data forwarding unit to respond to a trace log request; a determining unit determines whether the ratio of error logs versus unsent trace logs is equal to or greater than a predetermined threshold value; a differential trace log creator configured to create differential trace logs, wherein the duplicate error logs have been deleted from the unsent trace logs, when it is determined that the error log ratio is equal to or greater than the predetermined threshold value; and a response data configuration unit configured to set response data with the differential trace logs, and to set the response data with the unsent trace logs when the error log ratio is not equal to or greater than the predetermined threshold value.

6 Claims, 10 Drawing Sheets

| TOTAL DATA LENGTH (101A) | | | |
|---|---|---|---|
| REQUEST TYPE: VALUE INDICATING POLICY CONFIGURATION REQUEST, ERROR LOG MONITORING REQUEST, OR TRACE LOG COLLECTION REQUEST (101B) | | | STATIC DATA 101 |
| ERROR LOG DETERMINATION THRESHOLD VALUE (102A) | | | |
| LOG FILE NAME 1 (102B) | MONITORING FLAG 1 (102C) | COLLECTION FLAG 1 (102D) | POLICY DATA 102 |
| LOG FILE NAME 2 | MONITORING FLAG 2 | COLLECTION FLAG 2 | |
| ... | ... | ... | |

LOG COLLECTING APPARATUS, PROGRAM, METHOD, AND SYSTEM

CROSS-REFERENCE TO RELATED APPLICATIONS

This application is based upon and claims the benefit of priority of the prior Japanese Patent Application No. 2009-281975, filed on Dec. 11, 2009, the entire contents of which are incorporated herein by reference.

FIELD

The embodiments discussed herein are related to log collection technology.

BACKGROUND

In an established log collecting system of the related art, logs from multiple parts of a distributed system are individually collected by log collecting apparatus respectively installed on the multiple parts of the distributed system. The logs collected by each log collecting apparatus are then centrally managed at a log managing apparatus. Furthermore, in this log management system, the following processes exist: an error log monitoring process, which monitors error logs on the distributed system; and a trace log collection process, which collects all logs on the distributed system.

When executing the error log monitoring process, the log collecting apparatus check the log contents at short intervals, while prioritizing real-time performance and reduced network load. Only log records that are determined to be errors (i.e., error logs) are forwarded to the log managing apparatus. When executing the trace log collection process, the log collecting apparatus utilize a period of low network load, such as nighttime, and all unsent log records on the distributed system (i.e., trace logs) are forwarded to the log managing apparatus. Since the error log monitoring process and the trace log collection process differ in their usage properties, each process is executed independently.

Meanwhile, network load has become a serious problem in such log collecting systems in recent years. This is because, as the scale of the system increases, greater amounts of data must be forwarded to the log managing apparatus from each log collecting apparatus when executing the error log monitoring process or the trace log collection process. Thus, in log management systems of the related art, techniques have been implemented to minimize the amount of data forwarded to the log managing apparatus from each log collecting apparatus (see, for example, Japanese Unexamined Patent Application Publication Nos. H2-302844 and 2003-216457).

However, even if the amount of data forwarded to the log managing apparatus from each log collecting apparatus is minimized in log collecting systems of the related art, duplicate data is still forwarded by the error log monitoring process and the trace log collection process. For example, if a log collecting apparatus detects an error log when executing the error log monitoring process, then that error log will be forwarded to the log managing apparatus. However, when executing the trace log collection process, the trace log containing that error log will also be forwarded to the log managing apparatus, and the error log is thus forwarded twice. Consequently, as the number of data-forwarding log collecting apparatus and parts in the distributed system increases, the amount of forwarded duplicate data also increases, and the load on the network becomes larger.

SUMMARY

According to an aspect of the invention, a log collecting apparatus includes: a response data forwarding unit configured to respond to a trace log request by forwarding response data set with unsent trace logs to a request source; an error log ratio determining unit configured to determine whether a ratio of error logs versus unsent trace logs is equal to or greater than a predetermined threshold value when unsent trace logs that duplicate error logs exist with respect to the trace log request; a differential trace log creator configured to create differential trace logs, wherein the duplicate error logs have been deleted from the unsent trace logs, when the error log ratio determining unit determines that the error log ratio is equal to or greater than the predetermined threshold value; and a response data configuration unit configured to set response data with the differential trace logs created by the differential trace log creator, and to set the response data with the unsent trace logs when the error log ratio determining unit that determines the error log ratio is not equal to or greater than the predetermined threshold value.

The object and advantages of the invention will be realized and attained by at least the feature, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the log collecting apparatus, log collecting program, log collecting method, and log collecting system disclosed herein will be described in detail on the basis of the drawings. However, it should be appreciated that the disclosed technology is not limited to these embodiments.

Embodiment 1

Figure 1:
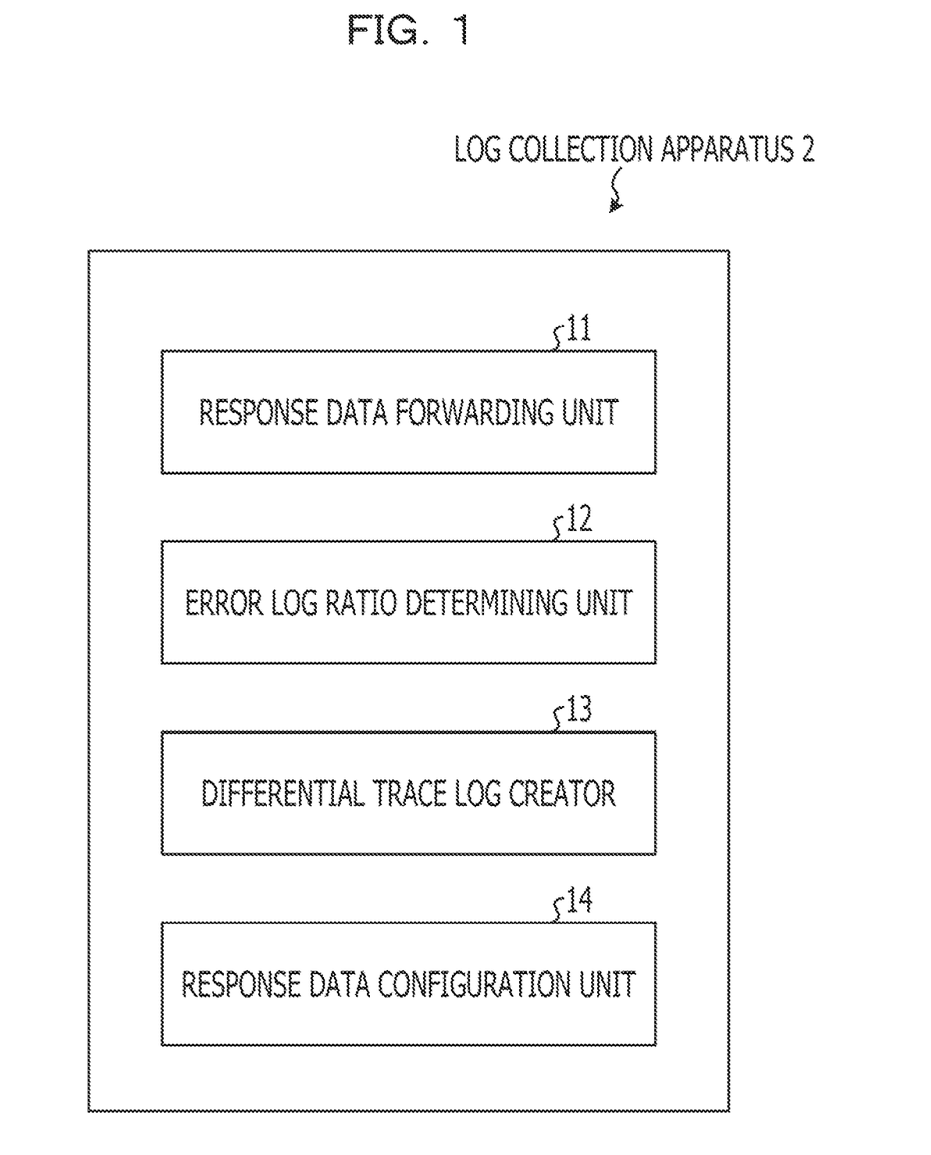
FIG. 1 is a block diagram illustrating a configuration of a log collecting apparatus in accordance with Embodiment 1.

FIG. 1 is a block diagram illustrating a configuration of a log collecting apparatus in accordance with Embodiment 1. The log collecting apparatus 2 illustrated in FIG. 1 includes a response data forwarding unit 11, an error log ratio determining unit 12, a differential trace log creator 13, and a response data configuration unit 14. In response to a trace log request, the response data forwarding unit 11 forwards response data set with unsent trace logs to the request source. When there are unsent trace logs with respect to the trace log request that duplicate error logs, the error log ratio determining unit 12 determines whether or not the ratio of error logs versus unsent trace logs is equal to or greater than a predetermined threshold value.

If it is determined by the error log ratio determining unit 12 that the error log ratio is equal to or greater than the predetermined threshold value, then the differential trace log creator 13 creates differential trace logs, wherein the duplicate error logs have been deleted from the unsent trace logs. The response data configuration unit 14 then sets the differential trace logs created by the differential trace log creator 13 in the response data. Also, if it is determined by the error log ratio determining unit 12 that the error log ratio is not equal to or greater than the predetermined threshold value, then the response data configuration unit 14 sets the unsent trace logs in the response data.

Consequently, in Embodiment 1, when the ratio of error logs versus unsent trace logs is equal to or greater than a predetermined value, differential trace logs are forwarded to the request source, wherein duplicate error logs have been deleted from the unsent trace logs. As a result, in Embodiment 1, the amount of data forwarded to the request source can be reduced by avoiding the forwarding of duplicate error logs inside the trace logs, thereby decreasing the load on the network. However, forwarding response data set with differential trace logs to the forwarding recipient incurs the significant processing load of creating the differential trace logs at the log collecting apparatus 2, in addition to the processing load of reconstructing the original trace logs at the forwarding recipient. Thus, if differential trace logs are created in a fixed manner to avoid forwarding duplicate error logs even when the ratio of error logs versus unsent trace logs is small, then the processing load on both the log collecting apparatus 2 and the forwarding recipient becomes larger, and overall system efficiency is reduced.

Consequently, in Embodiment 1, when the ratio of error logs versus unsent trace logs is not equal to or greater than a predetermined threshold value, it is determined that the data size of the duplicate error logs inside the trace logs is small, and the unsent trace logs are forwarded as-is to the request source. In other words, the processing method is dynamically changed according to the error log ratio, even in cases where duplicate error logs exist inside the unsent trace logs. As a result, in Embodiment 1 it is possible to reduce both the processing load of creating differential trace logs at the log collecting apparatus 2, as well as the processing load of reconstructing the original trace logs at the request source. Furthermore, it becomes possible to improve system efficiency.

Embodiment 2

Figure 2:
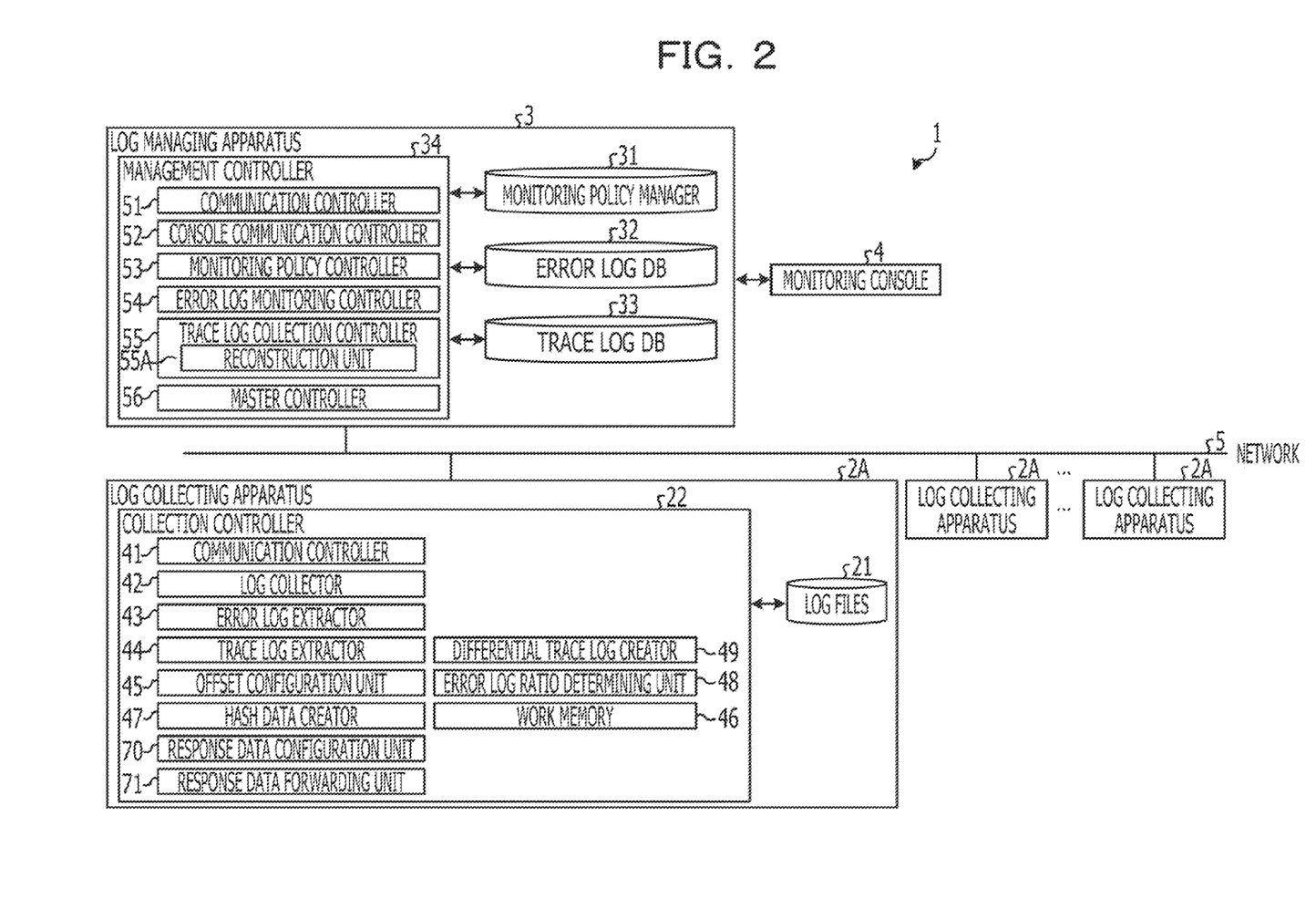
FIG. 2 is a block diagram illustrating a configuration of a log collecting system in accordance with Embodiment 2.

A log collecting system in accordance with Embodiment 2 will now be described in detail. FIG. 2 is a block diagram illustrating a configuration of a log collecting system in accordance with Embodiment 2. The log collecting system 1 illustrated in FIG. 2 includes log collecting apparatus 2A, a log managing apparatus 3, and a monitoring console 4. The log collecting apparatus 2A are connected to the log managing apparatus 3 via a network 5, and manage log collection on a distributed system. In addition, each log collecting apparatus 2A includes log files 21 and a collection controller 22. The log files 21 store log records successively collected on the distributed system. The collection controller 22 controls various processing operations executed within the log collecting apparatus 2A and hereinafter described.

In addition, the collection controller 22 inside each log collecting apparatus 2A includes a communication controller 41, a log collector 42, an error log extractor 43, a trace log extractor 44, an offset configuration unit 45, work memory 46, and a hash data creator 47. The collection controller 22 also includes an error log ratio determining unit 48, a differential trace log creator 49, a response data configuration unit 70, and a response data forwarding unit 71.

Figure 3:
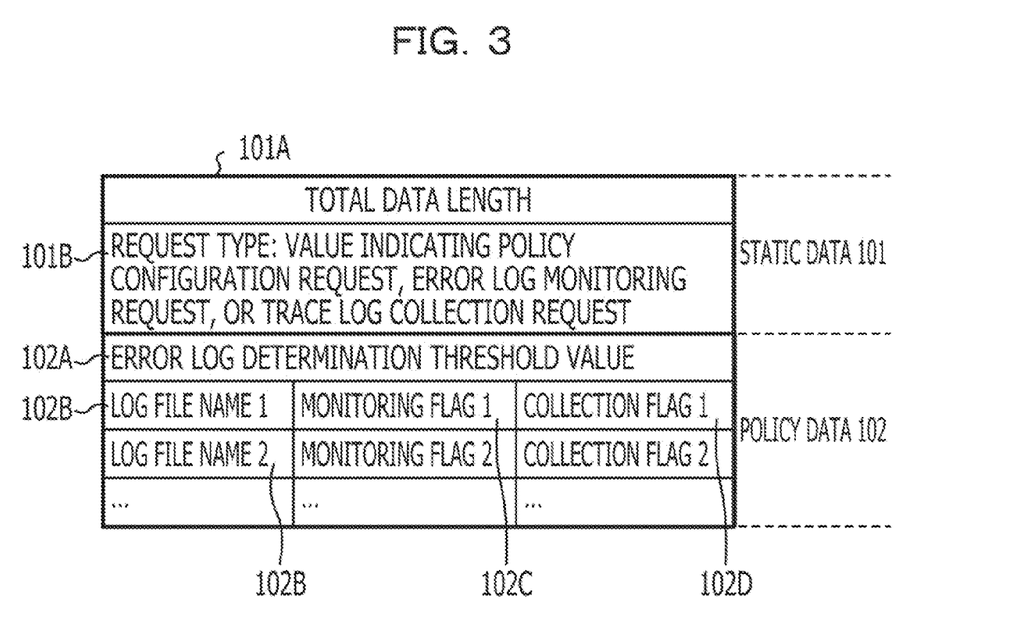
FIG. 3 is a diagram for explaining the data structure of various requests sent from a log managing apparatus to log collecting apparatus.

The communication controller 41 controls communication with the network 5. In addition, the communication controller 41 detects various requests transmitted from the log managing apparatus 3 via the network 5. FIG. 3 is a diagram for explaining the data structure of various requests sent from a log managing apparatus to log collecting apparatus. The various requests illustrated in FIG. 3 each include static data 101 and policy data 102. The static data 101 includes: the total data length 101A, which indicates the data length of the various requests; and the request type 101B, which indicates the type of the various requests. Herein, the request type 101B may correspond to a value that identifies a policy configuration request, an error log monitoring request, or a trace log collection request, for example. The policy data 102 includes: an error log determination threshold value 102A, log file names 102B, monitoring flags 102C, and collection flags 102D. The error log determination threshold value 102A corresponds to the threshold value used in the determination operations conducted by the error log ratio determination to be hereinafter described. The log file names 102B correspond to the names that identify the requested log files 21. The monitoring flags 102C correspond to flags that are set to ON when monitoring the requested log files 21. The collection flags 102D correspond to flags that are set to ON when collecting the requested log files 21.

Figure 4:
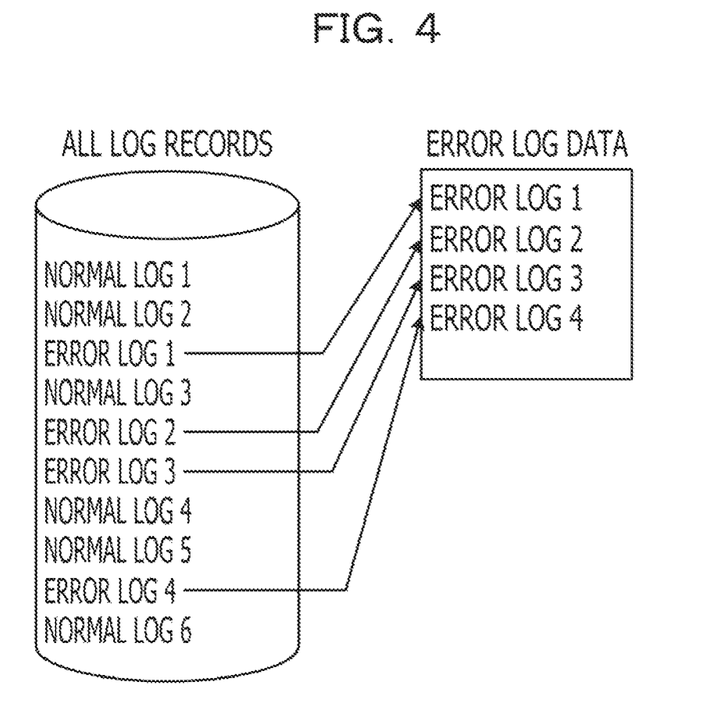
FIG. 4 is a diagram for explaining one example of the operation of an error log extractor.

The log collector 42 successively collects logs on the distributed system. In addition, the log collector 42 also identifies collected logs as being trace logs or error logs on the basis of the monitoring policy, and successively stores the identification results as log records in the log files 21. Upon detecting an error log monitoring request from the log managing apparatus 3, for example, the error log extractor 43 extracts unsent error logs from log records inside the log files 21. Herein, unsent error logs correspond to error logs that have not yet been forwarded to the log managing apparatus 3. Unsent logs may also be identified by the value of a sent flag set for each log inside the log files 21, for example. As another example, if logs inside the log files 21 are set to be deleted after being sent, then unsent logs may be identified by their presence inside the log files 21. FIG. 4 is a diagram for explaining one example of the operation of the error log extractor 43. Upon detecting an error log monitoring request from the log managing apparatus 3, the error log extractor 43 in FIG. 4 extracts, for example, the error log records for the unsent error logs 1 to 4 from out of all log records inside the log files 21.

Upon detecting a trace log collection request from the log managing apparatus 3, the trace log extractor 44 extracts unsent trace logs from log records inside the log files 21.

Herein, unsent trace logs correspond to trace logs that have not yet been forwarded to the log managing apparatus 3. Also, trace logs herein refer to log records that are kept as an audit trail, and which include normal logs and/or error logs.

Figure 5:
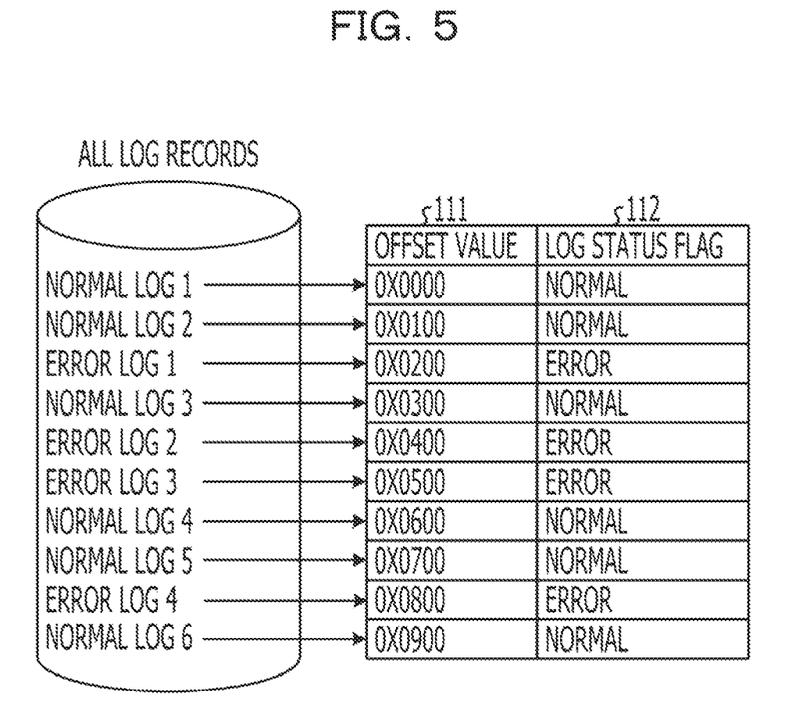
FIG. 5 is a diagram for explaining one example of the operation of an offset configuration unit.

The offset configuration unit 45 sets offset values, which indicate the entry positions of individual logs (normal logs and error logs) inside the log records. Herein, log entry positions are the address positions of logs successively stored in the log files 21, and are expressed as relative values from the start address. Consequently, the offset configuration unit 45 may be made to recognize the data size (i.e., byte length) of individual logs from the volume existing between the start address and the end address inside the log files 21 where logs are stored. FIG. 5 is a diagram for explaining one example of the operation of the offset configuration unit 45. The offset configuration unit 45 in FIG. 5 sets an offset value 111 and a log status flag 112 in the work memory 46 for each log record (normal log or error log) inside the log files 21. Herein, the offset configuration unit 45 acquires the address position for each log record, and sets this address position in the work memory 46 as the offset value 111. Additionally, for each log record, the offset configuration unit 45 sets a value indicating whether that log is a normal log or an error log (i.e., a value indicating the log status) in the work memory 46 as the log status flag 112.

In the example illustrated in FIG. 5, the normal log 1 has an offset value 111 of "0x0000", and its log status flag 112 reads normal. The normal log 2 has an offset value 111 of "0x0100", and its log status flag 112 reads normal. Meanwhile, the error log 1 in FIG. 5 has an offset value 111 of "0x0200", and its log status flag 112 reads error. On the basis of these offset values 111, the collection controller 22 is able to recognize the log order as being the normal log 1, the normal log 2, the error log 1, and so on. Furthermore, since the collection controller 22 may convert the offset values 111 into data sizes, the collection controller 22 is also able to recognize the data size of each log among the normal log 1, the normal log 2, the error log 1, and so on.

The hash data creator 47 creates hash data so that the integrity of the trace logs may be checked. Herein, hash data refers to data that is checked when forwarding trace logs from the log collecting apparatus 2A to the log managing apparatus 3. By checking the hash data, it is determined whether or not the trace logs acquired by the log managing apparatus 3 are identical to the trace logs acquired by the log collecting apparatus 2A before forwarding. When unsent trace logs that duplicate error logs exist inside log files 21 to be sent in response to a trace log collection request, the error log ratio determining unit 48 determines whether or not the ratio of error logs versus unsent trace logs is equal to or greater than an error log determination threshold value.

Figure 6:
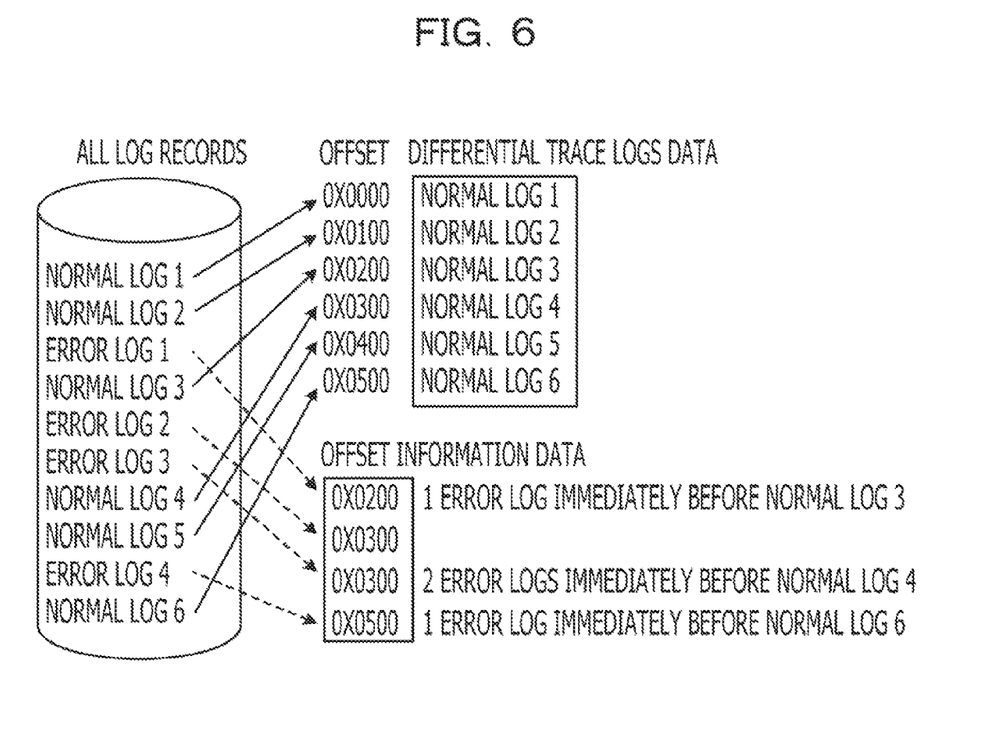
FIG. 6 is a diagram for explaining one example of the operation of an offset configuration unit when creating differential trace logs.

If it is determined by the error log ratio determining unit 48 that the error log ratio is equal to or greater than the error log determination threshold value, then the differential trace log creator 49 creates differential trace logs, wherein the duplicate error logs have been deleted from the unsent trace logs. For example, by extracting just the normal logs from the unsent trace logs, the differential trace log creator 49 creates differential trace logs wherein the duplicate error logs have been deleted. At this point, the offset configuration unit 45 re-sets the offset values used in the work memory 46, in order to reconstruct the unsent trace logs from the differential trace logs created by the differential trace log creator 49. FIG. 6 is a diagram for explaining one example of the operation of the offset configuration unit 45 when creating differential trace logs. By way of example, all log records inside the log files 21 in FIG. 6 are ordered as follows: the normal log 1, the normal log 2, the error log 1, the normal log 3, the error log 2, the error log 3, the normal log 4, the normal log 5, the error log 4, and the normal log 6.

The error log extractor 43 extracts error logs from all log records, extracting the error logs 1 to 4, for example. Using the offset values 111 currently set in the work memory 46, the error log ratio determining unit 48 computes the data size of all unsent log records, as well as the data size of all error logs (e.g., the error logs 1 to 4) among the log records. In addition, the error log ratio determining unit 48 determines whether or not the ratio of the data size of the unsent data logs versus the data size of all unsent log records is equal to or greater than an error log determination threshold value.

If the determination result from the error log ratio determining unit 48 is equal to or greater than the error log determination threshold value, then the differential trace log creator 49 extracts just the normal logs from all log records, and creates a differential trace log of the normal logs 1 to 6. The offset configuration unit 45 then re-sets the respective offset values for each of the normal logs 1 to 6 in the work memory 46. For example, the offset configuration unit 45 may re-set the offset values as follows: the offset value "0x0000" for the normal log 1, the offset value "0x0100" for the normal log 2, the offset value "0x0200" for the normal log 3, the offset value "0x0300" for the normal log 4, the offset value "0x0400" for the normal log 5, and the offset value "0x0500" for the normal log 6.

In addition, the offset configuration unit 45 re-sets the offset values indicating the positions of the individual error logs among all log records. The offset value for each error log is re-set in the work memory 46 so as to express the offset value of the normal log occurring immediately after that error log. For example, as illustrated in FIG. 6, the error log 1 is a single error log occurring immediately prior to the normal log 3. For this reason, the offset configuration unit 45 re-sets the offset value of the error log 1 in the work memory 46 to the offset value "0x0200" of the normal log 3. Similarly, the error logs 2 and 3 are two error logs occurring immediately prior to the normal log 4. For this reason, the offset configuration unit 45 re-sets the offset values of the error logs 2 and 3 in the work memory 46 to the offset value "0x0300" of the normal log 4. Also, the error log 4 is a single error log occurring immediately prior to the normal log 6, for example. For this reason, the offset configuration unit 45 re-sets the offset value of the error log 4 in the work memory 46 to the offset value "0x0500" of the normal log 6.

Figure 7:
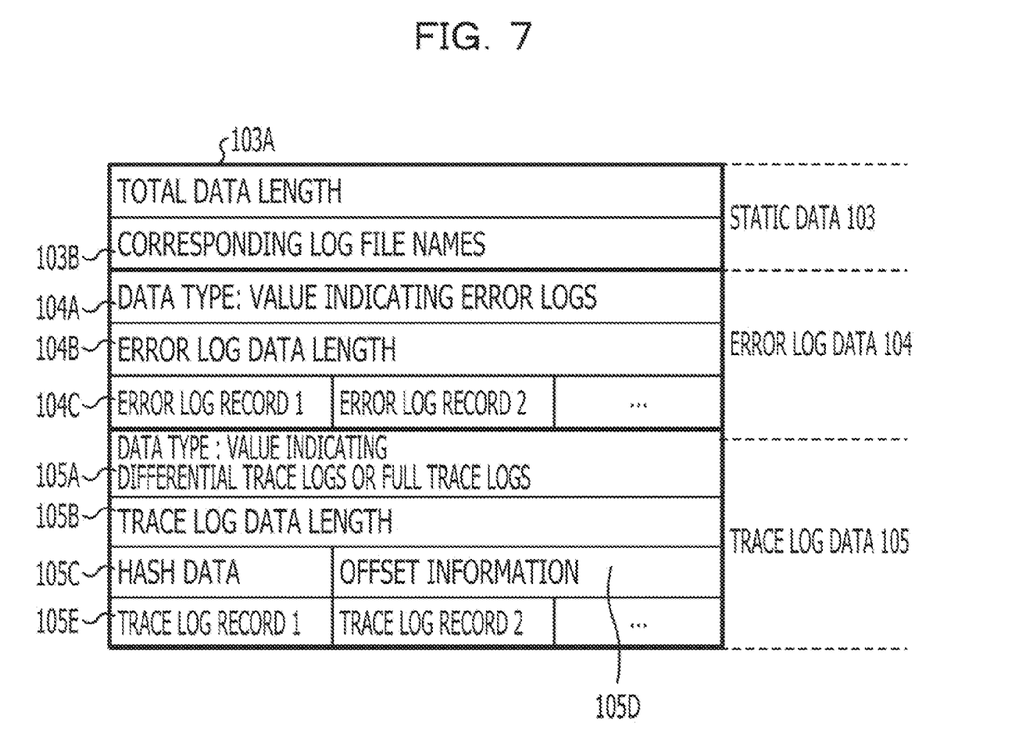
FIG. 7 is a diagram for explaining the data structure of response data sent from log collecting apparatus to a log managing apparatus.

In response to log requests from the log managing apparatus 3, the response data configuration unit 70 sets response data depending on the particular log request. FIG. 7 is a diagram for explaining the data structure of response data sent from the log collecting apparatus 2A to the log managing apparatus 3. The response data illustrated in FIG. 7 includes static data 103, error log data 104, and trace log data 105. The static data 103 includes the total data length 103A and the corresponding log file names 103B. The total data length 103A corresponds to the data length of the response data, while the corresponding log file names 103B corresponds to the file names that identify the corresponding logs. Meanwhile, the error log data 104 includes the data type 104A, the error log data length 104B, and error log records 104C. The data type 104A corresponds to a value that identifies error logs, while the error log data length 104B corresponds to the data length of the error log records 104C included in the response data. The error log records 104C correspond to the contents of the error log.

The trace log data 105 includes the data type 105A, the trace log data length 105B, hash data 105C, offset information 105D, and trace log records 105E. The data type 105A corresponds to a value identifying full trace logs or differential trace logs. The trace log data length 105B corresponds to the data length of the trace log records 105E. The hash data 105C corresponds to the data created by the hash data creator 47. The offset information 105D corresponds to the offset values that are set in the case of differential trace logs, and which are used to reconstruct the original trace logs. The trace log records 105E correspond to the contents of the trace logs.

In other words, four types of response data exist: error log response data, differential trace log response data, full trace log (without error logs) response data, and full trace log (with error logs) response data. First, the error log response data includes the static data 103 and the error log data 104. The differential trace log response data includes the static data 103, the error log data 104, and the trace log data 105. In this case, the data type 105A included in the trace log data 105 stores a value indicating differential trace logs, and the offset information 105D stores offset values used for trace log reconstruction. The full trace log (without error logs) response data includes the static data 103 and the trace log data 105. In this case, the data type 105A included in the trace log data 105 stores a value indicating full trace logs. Since the trace logs do not need to be reconstructed at the forwarding destination, the offset information 105D is empty. The full trace log (with error logs) response data includes the static data 103, the error log data 104, and the trace log data 105. In this case, the data type 105A included in the trace log data 105 stores a value indicating full trace logs, and the trace log data offset information 105D is likewise empty.

If there are unsent error logs inside the log records stored in the log files 21 when an error log monitoring request is made, then the response data configuration unit 70 sets error log response data. If there are error logs in the unsent trace logs when a trace log collection request is made, and if it is determined by the error log ratio determining unit 48 that the ratio of error logs versus unsent trace logs is equal to or greater than the error log determination threshold value, then the response data configuration unit 70 sets differential trace log response data. In the case of setting differential trace log response data, the response data configuration unit 70 also sets offset values for both error logs and normal logs inside the offset information 105D included in the trace log data 105 of the response data. The offset values in this case are values that have been re-set following the creation of the differential trace logs.

In contrast, if there are no error logs in the unsent trace logs when a trace log collection request is made, then the response data configuration unit 70 sets response data including the unsent trace logs without modification. In other words, the response data configuration unit 70 sets full trace log (without error logs) response data. Even in the case where there are error logs in the unsent trace logs when a trace log collection request is made, if it is determined by the error log ratio determining unit 48 that the ratio of error logs versus unsent trace logs is less than the error log determination threshold value, then the response data configuration unit 70 sets full trace log (with error logs) response data.

In response to a log request from the log managing apparatus 3, the response data forwarding unit 71 takes error log response data, differential trace log response data, full trace log (without error logs) response data, or full trace log (with error logs) response data that has been set by the response data configuration unit 70, and forwards the response data to the log managing apparatus 3 via the communication controller 41.

The log managing apparatus 3 is connected to each log collecting apparatus 2A via the network 5, and manages the collection of logs on each part of the distributed system. Additionally, the log managing apparatus 3 includes a monitoring policy manager 31, an error log database (hereinafter abbreviated to DB) 32, a trace log DB 33, and a management controller 34. The monitoring policy manager 31 manages monitoring policies, which express settings for features such as error log monitoring processes, for example. The error log DB 32 manages error logs from respective parts of the distributed system in accordance with error log monitoring requests. The trace log DB 33 manages trace logs from respective parts of the distributed system in accordance with trace log collection requests. The management controller 34 executes various processing operations inside the log managing apparatus 3, to be hereinafter described.

The management controller 34 in the log managing apparatus 3 includes a communication controller 51, a console communication controller 52, a monitoring policy controller 53, an error log monitoring controller 54, a trace log collection controller 55, and a master controller 56. The communication controller 51 controls communication connections with the network 5, and connects to respective log collecting apparatus 2A via the network 5. The console communication controller 52 controls communication connections with the monitoring console 4. The monitoring policy controller 53 controls the monitoring policy manager 31. The error log monitoring controller 54 controls the error log DB 32. When error log response data is detected, the error log monitoring controller 54 saves the error log records 104C in the error log DB 32, and notifies the monitoring console 4 with an error log alarm.

The trace log collection controller 55 controls the trace log DB 33. When full trace log response data is detected, the trace log collection controller 55 checks the integrity of the trace log records 105E on the basis of the hash data included in the response data. If the integrity of the trace log records 105E is OK, then the trace log collection controller 55 also saves the trace log records 105E in the trace log DB 33. The trace log collection controller 55 also includes a reconstruction unit 55A, which uses the trace log records 105E in the differential trace logs to reconstruct the original trace log records. When differential trace log response is detected, the reconstruction unit 55A repositions the error log records 104C among the trace log records 105E of the differential trace logs on the basis of offset information 105D included in the response data, as well as the error log records 104C.

For example, on the basis of the offset value "0x0200" for the error log 1 as indicated by the information 105D illustrated in FIG. 6, the reconstruction unit 55A may reposition the error log 1 to just before the normal log 3 from the differential trace logs, which also has an offset value of "0x0200". Additionally, on the basis of the offset value "0x0300" for the error logs 2 and 3, the reconstruction unit 55A may reposition the error logs 2 and 3 in that order to just before the normal log 4, which also has an offset value of "0x0300". On the basis of the offset value "0x0500" for the error log 4, the reconstruction unit 55A may reposition the error log 4 to just before the normal log 6, which also has an offset value of "0x0500". As a result, the reconstruction unit 55A is able to reconstruct the original trace log records by repositioning the error logs among the normal logs included in the differential trace logs. Furthermore, the trace log collection controller 55 checks the integrity of the reconstructed trace log records on the basis of the hash data 105C included in the response data. If the check results indicate that the integrity is OK, then the trace log collection controller 55 saves the trace log records in the trace log DB 33.

The master controller 56 controls the overall operation of the management controller 34, issues an error log monitoring request to respective log collecting apparatus 2A via the network 5 at every cycle of a first polling interval. The master controller 56 also issues a trace log collection request to respective log collecting apparatus 2A via the network 5 at every cycle of a second polling interval. The master controller 56 may also issue a policy configuration request to respective log collecting apparatus 2A via the network 5 in response to predetermined operations, such as setting operations conducted from the monitoring console 4, for example.

The monitoring console 4 is connected to the log managing apparatus 3. The monitoring console 4 sets monitoring policies inside the monitoring policy manager 31, and also displays various information on a monitor, such as error logs and trace logs from respective parts of the distributed system, for example.

Figure 8:
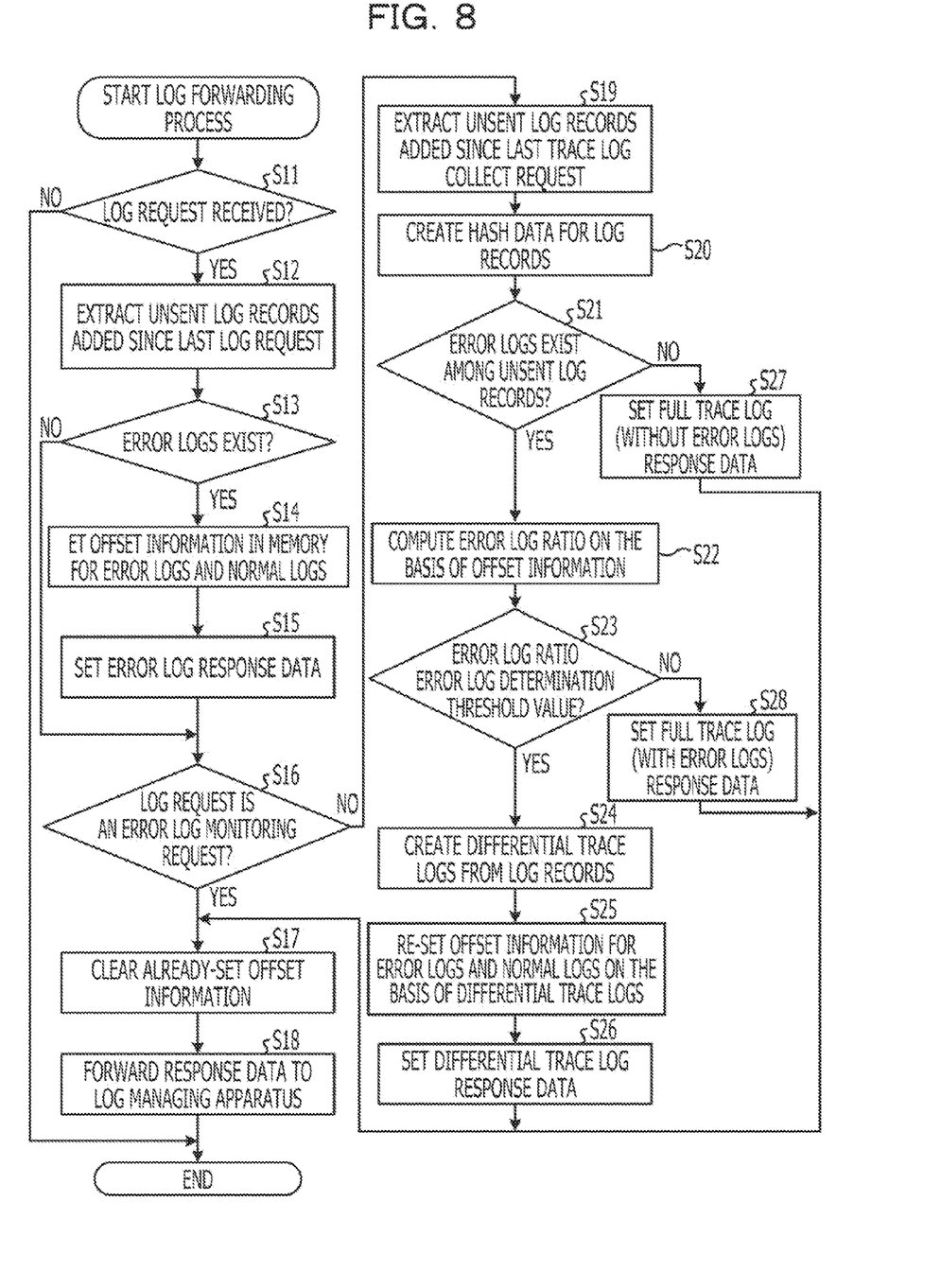
FIG. 8 is a flowchart illustrating processing operations conducted by a collection controller in accordance with a log forwarding process in a log collecting apparatus.

The operation of the log collecting system 1 in Embodiment 1 will now be described. FIG. 8 is a flowchart illustrating processing operations conducted by a collection controller 22 in accordance with a log forwarding process in a log collecting apparatus 2A.

The log forwarding process illustrated in FIG. 8 is a process for forwarding unsent logs inside the log collecting apparatus 2A to the log managing apparatus 3. This process is executed in response to a log request from the log managing apparatus 3, such as an error log monitoring request or a trace log collection request, for example.

The communication controller 41 inside the collection controller 22 in FIG. 8 determines whether or not a log request has been received from the log managing apparatus 3 (operation S11). If a log request has been received (operation S11: Yes), then the collection controller 22 extracts unsent log records that have been added to the log files 21 since the last log request (operation S12). Herein, unsent log records may also be referred to as unsent trace logs. The error log extractor 43 inside the collection controller 22 then determines whether or not error logs exist among the unsent log records, as illustrated in FIG. 4 (operation S13).

If it is determined that error logs do exist (operation S13: Yes), then the offset configuration unit 45 inside the collection controller 22 extracts those error logs, and sets offset information in the work memory 46 for both the error logs and the normal logs among the unsent log records (operation S14). The offset information set by the offset configuration unit 45 in the work memory 46 at this point is made up of an offset value 111 and a log status flag 112 for each log among the log records, as illustrated in FIG. 5.

Once the offset information has been set in the work memory 46, the response data configuration unit 70 inside the collection controller 22 creates error log response data by setting the static data 103 and the error log data 104 in the response data (operation S15). At this point, the error log data 104 is set with the error logs (e.g., the error log records 104C) that were extracted in operation S13.

On the basis of the request type 101B of the log request received in operation S11, the collection controller 22 determines whether or not the log request is an error log monitoring request (operation S16). If the log request is an error log monitoring request (operation S16: Yes), then the offset configuration unit 45 inside the collection controller 22 deletes the offset information that was set in the work memory 46 (operation S17). In addition, the response data forwarding unit 71 inside the collection controller 22 forwards the response data set by the response data configuration unit 70 to the log managing apparatus 3 (operation S18), and the processing operations are then terminated. In contrast, if error logs do not exist among the unsent log records (operation S13: No), then the collection controller 22 proceeds to operation S16 to determine whether or not the log request is an error log monitoring request.

If the log request is not an error log monitoring request (operation S16: No), then the collection controller 22 determines that the log request is a trace log collection request, and extracts unsent log records that have been added to the log files 21 since the last trace log collection request (operation S19). The hash data creator 47 inside the collection controller 22 then creates hash data for the unsent log records that were extracted (operation S20). The response data configuration unit 70 then determines whether or not error logs exist among the unsent log records (operation S21).

If error logs do exist among the unsent log records (operation S21: Yes), then the error log ratio determining unit 48 computes the data size of the unsent log records as well as the data size of the error logs, on the basis of the offset information in the work memory 46 (operation S22). At this point, by utilizing the offset information that was created in operation S14, the error log ratio determining unit 48 is able to easily extract the data sizes of both the unsent log records and the error logs. In addition, the error log ratio determining unit 48 computes the ratio of the data size of all error logs existing among the log records versus the data size of the unsent log records (operation S22). Subsequently, the error log ratio determining unit 48 determines whether or not the ratio of all error logs is equal to or greater than an error log determination threshold value (operation S23).

If it is determined that the ratio of all error logs is equal to or greater than the error log determination threshold value (operation S23: Yes), then the differential trace log creator 49 inside the collection controller 22 creates differential trace logs by extracting the normal logs from among all log records, as illustrated in FIG. 6 (operation S24). In addition, on the basis of the differential trace logs, the offset configuration unit 45 re-sets the offset information for both the error logs and the normal logs, as illustrated in FIG. 6 (operation S25).

The response data configuration unit 70 creates differential trace log response data by additionally setting the trace log data 105 in the response data that was set in operation S15 (operation S26). The response data configuration unit 70 then proceeds to operation S17 to delete the offset information that was set in the work memory 46. At this point, the trace log data 105 stores the hash data 105C created in operation S20, the differential trace logs (i.e., the trace log records 105E) created in operation S24, and the offset information 105D re-set in operation S25.

In contrast, if error logs do not exist among the unsent log records (operation S21: No), then the response data configuration unit 70 creates full trace log (without error logs) response data to forward the unsent log records as-is (operation S27). Herein, the full trace log (without error logs) response data includes the static data 103 and the trace log data 105. The trace log data 105 stores the trace log records 105E, as well as the hash data 105C created in operation S20. In this case, the offset information 105D inside the trace log data 105 is empty. Subsequently, the response data configuration unit 70 proceeds to operation S17 to delete the offset information that was set. On the other hand, if a log request has not been received (operation S11: No), then the communication controller 41 terminates the processing operations.

Also, if it is determined that the ratio of all error logs is not equal to or greater than the error log determination threshold value (operation S23: No), then the response data configuration unit 70 creates full trace log (with error logs) response data to forward the unsent log records as-is (operation S28). Herein, the full trace log (with error logs) response data includes the static data 103, the error log data 104, and the trace log data 105. The trace log data 105 stores the trace log records 105E, as well as the hash data 105C created in operation S20. In this case, the offset information 105D inside the trace log data 105 is empty. Subsequently, the response data configuration unit 70 proceeds to operation S17 to delete the offset information that was set.

In the log forwarding process illustrated in FIG. 8, if error logs exist among the unsent log records when a trace log collection request is made, then it is determined whether or not the ratio of error logs versus unsent log records is equal to or greater than an error log determination threshold value. If the error log ratio is equal to or greater than the error log determination threshold value, then the error log ratio is determined to be large, and differential trace log response data is forwarded to the log managing apparatus 3. As a result, since differential trace logs are forwarded when the error log ratio is large, network load may be reduced in the log forwarding process by decreasing the amount of forwarded trace log records data that duplicates error logs.

Furthermore, in the log forwarding process, if the error log ratio is less than the error log determination threshold value, then the error log ratio is determined to be small, and full trace log response data is forwarded to the log managing apparatus 3. In other words, even if duplicate error logs exist among the unsent log records, the processing method is dynamically changed such that either differential trace log response data or full trace log (with error logs) response data is forwarded, depending on the error log ratio, for example. As a result, in the log forwarding process, the processing load of creating the differential trace logs at the log collecting apparatus 2A may be decreased, while in addition, the processing load of reconstructing the original trace logs at the log managing apparatus 3 may also be decreased, thereby making it possible to improve system efficiency.

Moreover, when creating differential trace log response data in the log forwarding process, hash data 105C and offset information 105D is set inside the trace log data 105. As a result, the offset information 105D may be used to reconstruct the original trace log records from the differential trace logs at the log managing apparatus 3 that receives the response data. Additionally, the hash data 105C may be used to check the integrity of the reconstructed trace log records.

Figure 9:
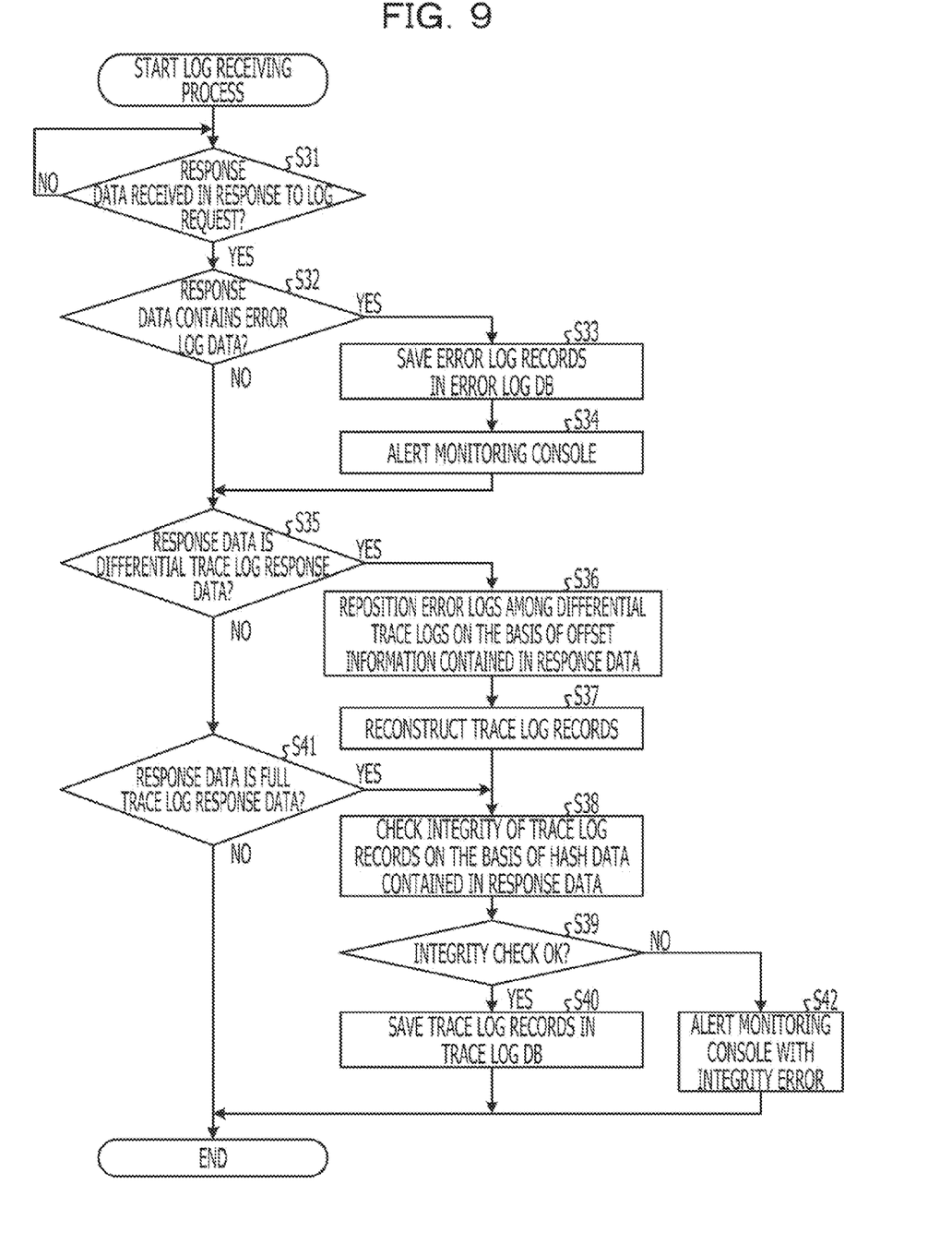
FIG. 9 is a flowchart illustrating processing operations conducted by a management controller in accordance with a log receiving process in a log managing apparatus.

Operation of the log managing apparatus 3 that receives response data from respective log collecting apparatus 2A in response to log requests will now be described. FIG. 9 is a flowchart illustrating processing operations conducted by the management controller 34 in accordance with a log receiving process in the log managing apparatus 3.

The communication controller 51 inside the management controller 34 in FIG. 9 determines whether or not response data with respect to a log request has been received via the network 5 (operation S31). If response data has been received (operation S31: Yes), then the error log monitoring controller 54 inside the management controller 34 uses the data type 104A included in the response data as a basis for determining whether or not error log data 104 exists (operation S32). If error log data 104 does exist (operation S32: Yes), then the error log monitoring controller 54 saves the error log records 104C included in the response data in the error log DB 32 (operation S33).

Once the error log records 104C are saved in the error log DB 32, the console communication controller 52 inside the management controller 34 alerts the monitoring console 4 that error logs have been produced (operation S34). At this point, by an alert on a monitor not illustrated in the drawings, the user of the monitoring console 4 is able to recognize that error logs have been produced.

In addition, once an alert has been transmitted to the monitoring console 4, the trace log collection controller 55 inside the management controller 34 uses the data type 105A included in the response data as a basis for determining whether or not the response data is differential trace log response data (operation S35). If the response data is differential trace log response data (operation S35: Yes), then the reconstruction unit 55A extracts offset information 105D, differential trace logs (e.g., the trace log records 105E), and error logs (e.g., the error log records 104C) from the response data (operation S36). Also, on the basis of the offset information 105D, the reconstruction unit 55A repositions appropriate error logs among the differential trace logs (operation S36). Subsequently, the reconstruction unit 55A reconstructs the original trace log records from the differential trace logs (operation S37). Once the original trace log records have been reconstructed from the differential trace logs, the trace log collection controller 55 also checks the integrity of the reconstructed trace log records, on the basis of the hash data 105C included in the response data (operation S38).

The trace log collection controller 55 determines whether or not the integrity check of the trace log records was OK (operation S39). If the integrity check of the trace log records was OK (operation S39: Yes), then the trace log collection controller 55 saves the trace log records in the trace log DB 33 (operation S40), and the processing operations are then terminated.

In contrast, if the response data is not differential trace log response data (operation S35: No), then the trace log collection controller 55 determines whether or not the response data is full trace log response data (operation S41). If the response data is full trace log response data (operation S41: Yes), then the trace log collection controller 55 proceeds to operation S38 to check the integrity of the full trace log records, on the basis of the hash data 105C included in the response data. On the other hand, if the response data is not full trace log response data (operation S41: No), then the trace log collection controller 55 terminates the processing operations illustrated in FIG. 9.

If it is determined on the basis of the hash data 105C that the integrity check of the trace log records was not OK (operation S39: No), then the console communication controller 52 alerts the monitoring console 4 with a trace log records integrity error (operation S42). The processing operations illustrated in FIG. 9 are then terminated.

On the other hand, if error log data 104 does not exist inside the response data (operation S32: No), then the error log monitoring controller 54 proceeds to operation S35 to determine whether or not the response data is differential trace log response data.

When differential trace log response data is detected in the log receiving process illustrated in FIG. 9, the offset information, differential trace logs, and error logs included in the response data are extracted, and the original trace log records are reconstructed on the basis of the offset information by repositioning the error logs among the differential trace logs. As a result, in the log managing apparatus 3, original trace log records may be reconstructed from differential trace logs, even when substantially suppressing the forwarding of trace logs that duplicate error logs.

Furthermore, when differential trace log response data is received in the log receiving process, the offset information 105D may be used to reconstruct the original trace log records from the differential trace logs, while in addition, the hash data 105C may be used to check the integrity of the reconstructed trace log records.

In FIG. 9 herein, the error log records 104C included in the response data are repositioned among the differential trace logs in operation S36. However, it should be appreciated that the error log records that were saved in operation S33 may also be repositioned among the differential trace logs.

In Embodiment 2, if error logs exist among the unsent log records when a trace log collection request is made, then it is determined whether or not the ratio of error logs versus the unsent log records is equal to or greater than an error log determination threshold value. If the error log ratio is equal to or greater than the error log determination threshold value, then the error log ratio is determined to be large, and differential trace log response data is forwarded to the log managing apparatus 3. As a result, in Embodiment 2, since differential trace logs are forwarded when the error log ratio is large, network load can be reduced by decreasing the amount of forwarded trace log records data that duplicates error logs.

Furthermore, in Embodiment 2, if the error log ratio is less than the error log determination threshold value, then the error log ratio is determined to be small, and full trace log response data is forwarded to the log managing apparatus 3. In other words, even if duplicate error logs exist among the unsent log records, the processing method is dynamically changed such that either differential trace log response data or full trace log (with error logs) response data is forwarded, depending on the error log ratio, for example. As a result, in Embodiment 2, the processing load of creating the differential trace logs at the log collecting apparatus 2A may be decreased, while in addition, the processing load of reconstructing the original trace logs at the log managing apparatus 3 may also be decreased, thereby making it possible to improve system efficiency.

Moreover, when creating differential trace log response data in Embodiment 2, hash data 105C and offset information 105D is set inside the trace log data 105. As a result, the offset information 105D may be used to reconstruct the original trace log records from the differential trace logs at the log managing apparatus 3 that receives the response data. Additionally, the hash data 105C can be used to check the integrity of the reconstructed trace log records.

Furthermore, in Embodiment 2, even though the amount of data centrally managed by the log managing apparatus 3 increases with increasing numbers of log collecting apparatus 2A or parts in the distributed system, the load on the network may be reduced as described above, by decreasing the amount of forwarded trace log records data that duplicates error logs. As a result, whereas trace log collection in the related art is primarily conducted at nighttime when the network load is low, in Embodiment 2 it becomes possible to perform trace log collection even during the day.

Furthermore, in Embodiment 2, the total time required to forward data may also be shortened by decreasing the amount of duplicate error logs among the unsent trace logs that are forwarded when a trace log collection request is made.

In the embodiments herein, the error log ratio determining unit 12 (48) calculates the ratio of error logs versus unsent trace logs by using data sizes. However, it should be appreciated that the error log ratio may also be calculated by using numbers of logs.

It should also be appreciated that the individual elements in the respective components illustrated herein are not required to be physically configured in the manner illustrated in the drawings. In other words, the specific configuration in which individual components are separated or integrated is not limited to that illustrated in the drawings, and all or part of the components herein may be functionally or physically separated or integrated in arbitrary units according to particular factors, such as various load and usage conditions. For example, the error log monitoring controller 54 and the trace log collection controller 55 may be integrated together as a single component. Likewise, the error log extractor 43 and the trace log extractor 44 may be integrated together as a single component. The response data configuration unit 70 and the response data forwarding unit 71 may also be integrated together as a single component. Furthermore, although the log managing apparatus 3 and the log collecting apparatus 2A are connected by the network 5 in a wired manner, wireless connections may also be used, for example.

Figure 10:
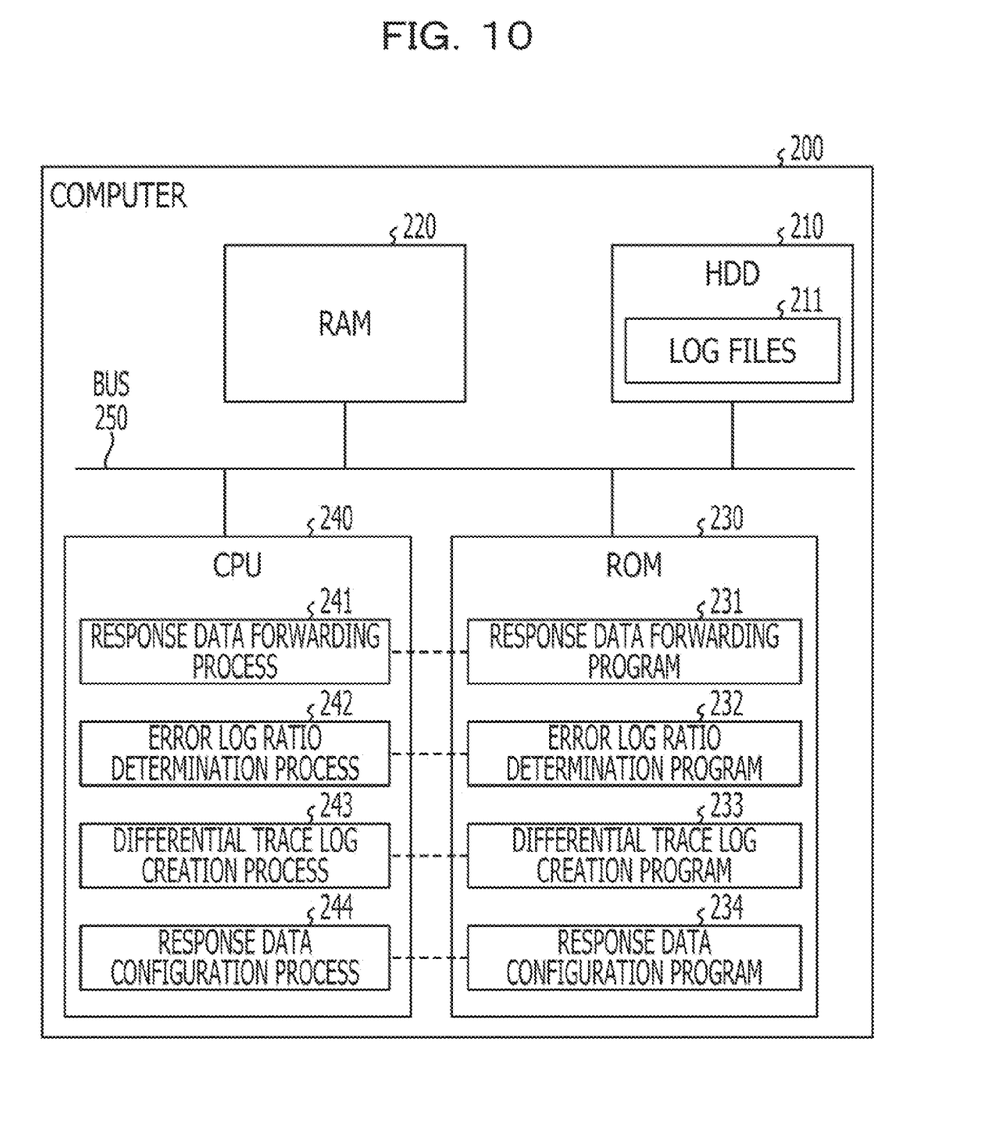
FIG. 10 illustrates a computer that executes log collecting programs.

The various processes described in the foregoing embodiments may also be realized as a result of a program prepared in advance being executed by a computer. Hereinafter, FIG. 10 will be used to describe one example of a computer that executes a program having functions similar to those of the foregoing embodiments. FIG. 10 illustrates a computer that executes log collecting programs.

As illustrated in FIG. 10, a computer 200 that executes log collecting programs includes a hard disk drive (HDD) 210, RAM 220, ROM 230, and a CPU 240, each being connected by a bus 250.

In the ROM 230, log collecting programs that exhibits functions substantially similar to those of the foregoing embodiments is stored in advance. In other words, as illustrated in FIG. 10, a response data forwarding program 231, an error log ratio determination program 232, a differential trace log creation program 233, and a response data configuration program 234 are stored in advance in the ROM 230. Herein, the program 231 to 234 may also be integrated or separated as appropriate, substantially similar to the individual component elements of the log collecting apparatus 2 illustrated in FIG. 1.

By reading out and executing these programs 231 to 234 from the ROM 230, the programs 231 to 234 respectively cause the CPU 240 to function as a response data forwarding process 241, an error log ratio determination process 242, a differential trace log creation process 243, and a response data configuration process 244, as illustrated in FIG. 10. Each of the processes 241 to 244 respectively correspond to the response data forwarding unit 11, the error log ratio determining unit 12, the differential trace log creator 13, and the response data configuration unit 14 illustrated in FIG. 1.

Also, as illustrated in FIG. 10, the HDD 210 is provided with log files 211. In addition to managing various logs with respect to the log files 211, the CPU 240 also reads out various logs from the log files 211 and stores such logs in the RAM 220, and executes processing on the basis of logs stored in the RAM 220, for example.

It should be appreciated that the respective program 231 to 234 described above do not need to be stored in the ROM 230. For example, the programs 231 to 234 may also be stored on a portable physical medium that may be inserted into the computer 200, such as a flexible disk (FD), a CD-ROM, an MO disc, a DVD disc, a magneto-optical disc, or an IC card. Alternatively, the programs 231 to 234 may also be stored on a stationary physical medium, such as a hard disk drive (HDD) or other device provided internally or externally to the computer 200, for example. Alternatively, the programs 231 to 234 may be stored on another computer (or server) connected to the computer 200 via a communication medium such as a public circuit, the Internet, a LAN, or a WAN, for example. The CPU 240 may also be configured to function as the respective processes 241 to 244 by reading out the respective programs 231 to 234 from such a portable physical medium, stationary physical medium, other computer, or other source, for example.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A log collecting apparatus, comprising:
a response data forwarding unit configured to respond to a trace log request by forwarding response data set with unsent trace logs to a request source;
an error log ratio determining unit configured to determine whether a ratio of error logs versus unsent trace logs is equal to or greater than a predetermined threshold value when unsent trace logs that duplicate error logs exist with respect to the trace log request;
a differential trace log creator configured to create differential trace logs, wherein the duplicate error logs have been deleted from the unsent trace logs, when the error log ratio determining unit determines that the error log ratio is equal to or greater than the predetermined threshold value; and
a response data configuration unit configured to set response data with the differential trace logs created by the differential trace log creator, and to set the response data with the unsent trace logs when the error log ratio determining unit determines that the error log ratio is not equal to or greater than the predetermined threshold value.

2. The log collecting apparatus according to claim 1, further comprising:
an error log extractor configured to extract duplicate error logs from the unsent trace logs when unsent trace logs that duplicate error logs exist with respect to the trace log request;
wherein
when the error log ratio determining unit determines that the error log ratio is equal to or greater than the predetermined threshold value, the response data configuration unit sets the response data with both the error logs extracted by the error log extractor and the differential trace logs created by the differential trace log creator.

3. A computer-readable, non-transitory medium storing a log collecting program, the log collecting program causing a computer to execute operations comprising:
responding to a trace log request by forwarding response data set with unsent trace logs to a request source;
determining whether the ratio of error logs versus unsent trace logs is equal to or greater than a predetermined threshold value when unsent trace logs that duplicate error logs exist with respect to the trace log request;
creating differential trace logs, wherein the duplicate error logs have been deleted from the unsent trace logs, when it is determined in the determining that the error log ratio is equal to or greater than the predetermined threshold value; and
setting response data with the differential trace logs created in the differential trace logs creating step, and setting the response data with the unsent trace logs when it is determined in the determining that the error log ratio is not equal to or greater than the predetermined threshold value.

4. A log collecting method for a log collecting system, the system including a log collecting apparatus that collect logs, and a log managing apparatus that manages logs collected by the log collecting apparatus, the method comprising:
in the log collecting apparatus,
responding to a trace log request by forwarding response data set with unsent trace logs to the log managing apparatus;
extracting the duplicate error logs from the unsent trace logs when unsent trace logs that duplicate error logs exist with respect to the trace log request;
determining whether the ratio of error logs versus unsent trace logs is equal to or greater than a predetermined threshold value;
creating differential trace logs, wherein the duplicate error logs have been deleted from the unsent trace logs, when it is determined in the determining that the error log ratio is equal to or greater than the predetermined threshold value; and
setting response data with the differential trace logs created in the differential trace logs creating step, and setting the response data with the unsent trace logs when it is determined in the determining that the error log ratio is not equal to or greater than the predetermined threshold value.

5. The log collecting method according to claim 4, further comprising:
in the log managing apparatus,
detecting the response data forwarded from the log collecting apparatus; and
reconstructing the unsent trace logs from the differential trace logs based on the error logs when response data set with the error logs and the differential trace logs is detected.

6. A log collecting apparatus, comprising:
a processor to execute a process, the process including:
responding to a trace log request by forwarding response data set with unsent trace logs to a request source;
determining whether a ratio of error logs versus unsent trace logs is equal to or greater than a predetermined threshold value when unsent trace logs that duplicate error logs exist with respect to the trace log request;
creating differential trace logs, wherein the duplicate error logs have been deleted from the unsent trace logs, when the error log ratio determining unit determines that the error log ratio is equal to or greater than the predetermined threshold value; and
setting response data with the differential trace logs created by the differential trace log creator, and to set the response data with the unsent trace logs when the error log ratio determining unit determines that the error log ratio is not equal to or greater than the predetermined threshold value.

* * * * *